D. E. HUMPHREY.
METHOD AND APPARATUS FOR DUSTING ARTICLES.
APPLICATION FILED DEC. 5, 1919.

1,400,289.

Patented Dec. 13, 1921.
5 SHEETS—SHEET 1.

Dwight E. Humphrey

D. E. HUMPHREY.
METHOD AND APPARATUS FOR DUSTING ARTICLES.
APPLICATION FILED DEC. 5, 1919.

1,400,289.

Patented Dec. 13, 1921.
5 SHEETS—SHEET 4.

Inventor
Dwight E. Humphrey

D. E. HUMPHREY.
METHOD AND APPARATUS FOR DUSTING ARTICLES.
APPLICATION FILED DEC. 5, 1919.
1,400,289.
Patented Dec. 13, 1921.
5 SHEETS—SHEET 5.
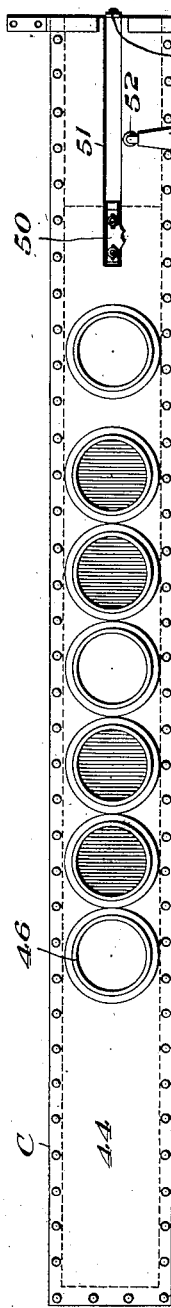
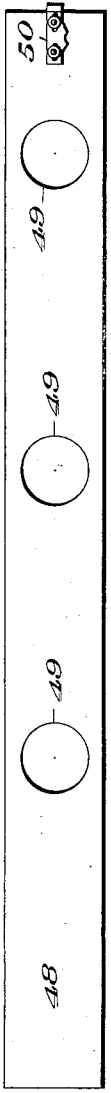
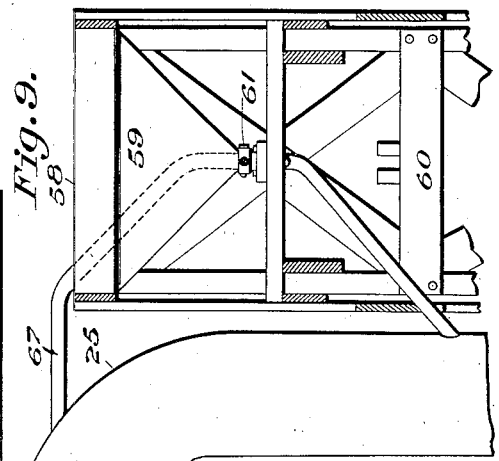
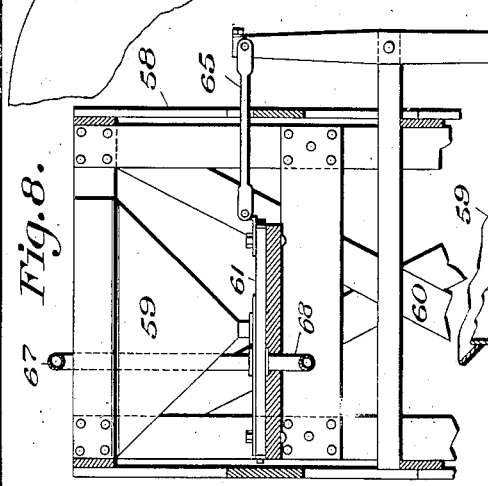
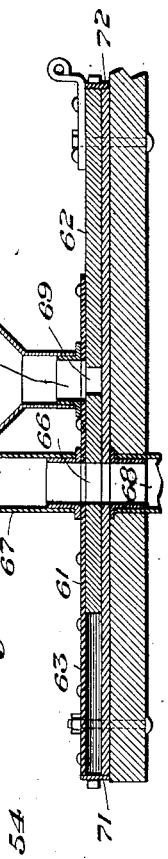
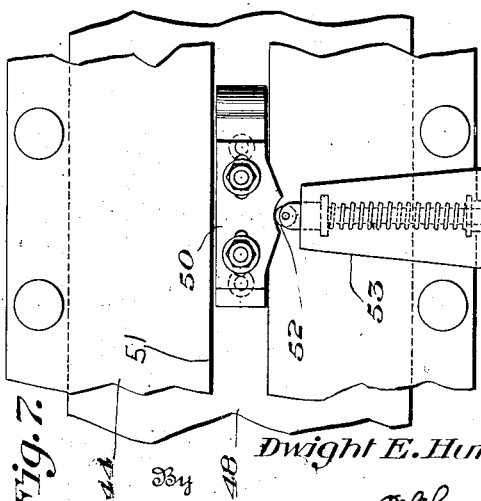
Inventor
Dwight E. Humphrey

UNITED STATES PATENT OFFICE.

DWIGHT E. HUMPHREY, OF AKRON, OHIO, ASSIGNOR TO THE GOODYEAR TIRE AND RUBBER COMPANY, OF AKRON, OHIO, A CORPORATION OF OHIO.

METHOD AND APPARATUS FOR DUSTING ARTICLES.

1,400,289.     Specification of Letters Patent.     Patented Dec. 13, 1921.

Application filed December 5, 1919. Serial No. 342,786.

*To all whom it may concern:*

Be it known that I, DWIGHT E. HUMPHREY, a citizen of the United States, and resident of Akron, Ohio, have invented new and useful Improvements in Methods and Apparatus for Dusting Articles; of which the following is a specification.

The present invention relates to improvements in methods and apparatus for use in coating articles with pulverulent or subdivided material, and is particularly designed for use in dusting tire carcasses with powdered soapstone, or the like.

One of the important operations included in the tire manufacture art is that of dusting the tire carcasses with powdered soapstone to prevent them from adhering to the molds in which they are cured or vulcanized. Heretofore this dusting operation has been performed principally by hand on one tire at a time, which is a laborious and unmethodical procedure and which consequently restricts the output and increases the cost of production. Moreover this hand dusting operation is not only wasteful but injurious to the health of the operator.

The present invention is designed, therefore, to produce a practical method and apparatus by means of which the above described operation may be expeditiously performed upon a number of tires at one time, whereby all parts of each carcass will receive an equal coating of the soapstone material, and wherein waste is reduced to a minimum and the operator protected from the injurious effects resulting from inhaling the powdered material.

Other objects together with the practicability and utility of the invention will become readily apparent when the following attached description is read in conjunction with the accompanying drawings, certain features of construction and combination of parts for which protection is desired being assembled and pointed out in the appended claims forming a part of this specification.

In the drawings:

Fig. 5 is an enlarged top plan view of the slide valve casing and slide mounted therein;

Fig. 6 is an enlarged top plan view of the valve slide;

Fig. 7 is a fragmentary top plan on a further enlarged scale of a portion of Fig. 5;

Fig. 8 is an enlarged sectional elevation of a portion of the soapstone feeding device;

Fig. 9 is a similar view of the soapstone feeding device taken at right angles to Fig. 8; and Fig. 10 is a detail transverse sectional view taken on a line central of Fig. 9.

Figure 1:
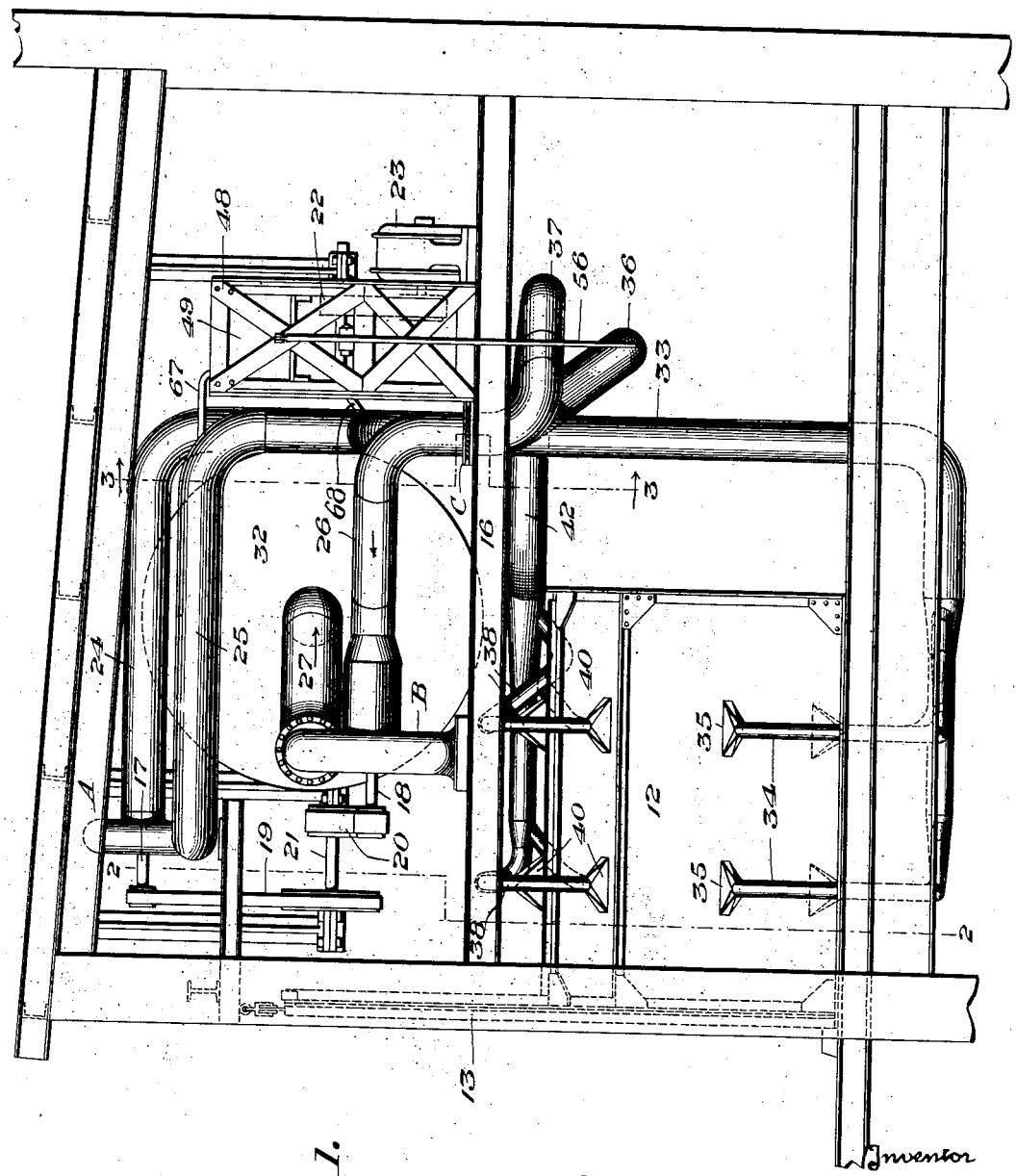
Figure 1 represents a side elevation of the invention.

Referring to the drawings, the numeral 12 designates a vault built of sheet metal or other suitable material which is open at its front end and provided with a door of any well known type, such as the sliding variety illustrated at 13. The vault 12 which is built upon the floor or a base structure if desired, is rendered as nearly dust tight as possible and is provided with trackways 14. A wheeled truck of a well known type supports, in a suspended position, a plurality of tire carcasses and is designated generally by the numeral 15. The truck is adapted to be wheeled upon the tracks 14 into and out of the vault as desired, and is merely illustrative of a means for introducing a plurality of tires in the vault, and forms no particular part of the invention. It is to be understood that various other devices may be utilized for the same purpose without departing from the spirit of the invention.

Mounted, preferably upon a superstructure 16, above the vault 12 is an air pump A, and a second pump B, both of which may be of any desired type. The pumps A and B have their respective shafts 17 and 18 belted as at 19 and 20 to a driven shaft 21, which is in turn suitably mounted upon the superstructure 16, as shown clearly in Fig. 1 of the drawings. The shaft 21 is driven by a belt connection 22 from a suitable source of power, such as a motor 23.

These pumps A and B are designed 1st, to force currents of air charged with powdered material such as soapstone through a series of pipes or ducts into the vault 12 against the carcasses therein; and 2nd, to exhaust the powdered material from the vault. The pipes or ducts are so interconnected between the pumps and the vault, that by manipulating a valve or damper the charged air currents may be directed in different circuits into and out of the vault and against different portions of the carcasses, or if desired the currents may be short circuited within the pipes or ducts, and thereby cut off from the vault with the powdered material kept in a suspended condition.

These operations are accomplished by means of apparatus, a detailed description of which follows.

The pump A has connected thereto, an inlet pipe 24 and a discharge pipe 25, and the pump B has also connected therewith, an inlet pipe 26 and a discharge pipe 27. Pipes 24, 25 and 26 are provided with vertical portions which have their lower ends seated at spaced intervals upon the casing of a horizontally disposed slide valve C, hereinafter described in detail. The inlet pipe 24 to pump A is provided with branch pipes 28 and 29, and the discharge pipe of the pump is likewise provided with branch pipes 30 and 31, each of which branches have their lower ends seated upon the casing of the valve previously mentioned and in alinement with said pipes 24 and 25.

The inlet pipe 26, to the pump B, has a vertical portion seated upon the casing of the valve C, in alinement with the previously described alined pipes, and the exhaust pipe 27 of the pump is connected to a suitable discharge drum or the like, designated by the numeral 32.

Beneath the casing of the slide valve C and having its upper end seated thereagainst, in position to register with the discharge pipe 25 of the pump A, is a vertical pipe 33 provided with a horizontal portion extending beneath the vault 12. That portion of the pipe 33 beneath the vault has a plurality of lateral branches 34, which are in turn provided with substantially vertical upstanding portions terminating in nozzles 35. Certain of these nozzles 35 project through the floor into the lower portion of the vault 12, while others project through the sidewalls of the vault at a point about midway of its height.

A union 36, which has its two ends seated against the under seat of the casing of the valve C connects the two branch pipes 28 and 30 beneath the casing and serves as a by-pass establishing communication between the inlet pipe 24 and discharge pipe 25 of pump A, when desired, for a purpose presently apparent.

Seated at one end against the under side of the casing of the valve, and registering with the vertical portion of the inlet pipe 26 of the pump B, is another pipe 37 disposed with the greater portion of its length in a horizontal plane and extending outwardly from beneath the valve casing around the union 36 where it terminates in a portion extending lengthwise of the vault 12, and disposed above and to one side thereof. This pipe 37 is also provided, at that portion thereof which is adjacent the vault, with branches 38 which extend to the corners of the roof of the vault 12, and some of which are in turn provided with branches 39 extending to the central portion of the roof of the vault. Each of these branches 38 and 39 terminate in a nozzle 40 which project through the roof of the vault, and are similar in construction to the nozzles 35 previously described.

Figure 2:
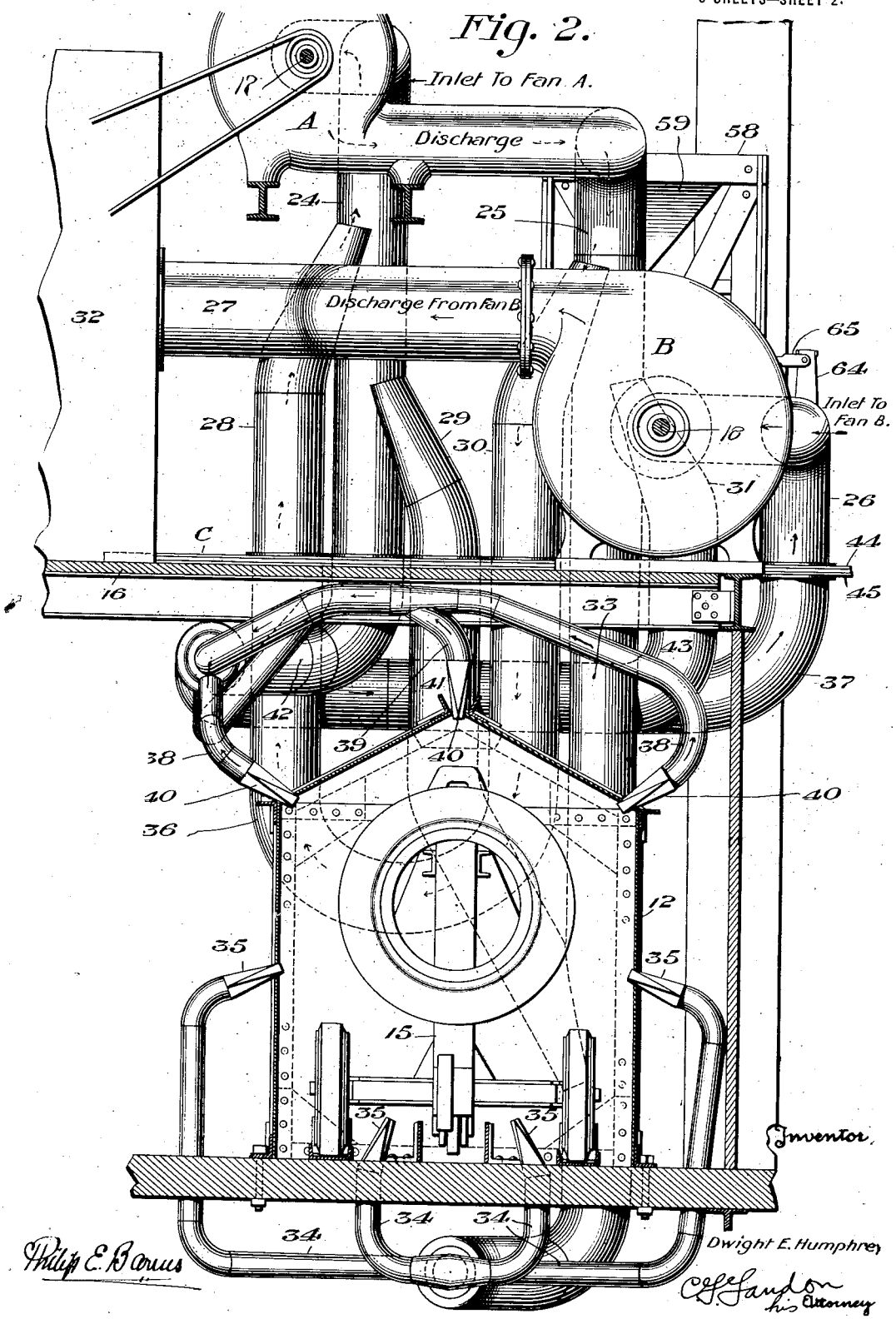
Fig. 2 represents a transverse section on an enlarged scale taken on the line 2—2 of Fig. 1.

By reference to Fig. 2 of the drawings, it will be noted that each of these nozzles 35 and 40 project into the vault in a position in radial alinement with the tire carcasses suspended from the truck 15. By means of this arrangement, the charged air currents are directed against different portions of the carcasses and an even coating of the soapstone thereon is insured.

The vertical pipe 33 is provided with an upwardly inclined branch pipe 41, which is seated at its upper end against the casing of the valve previously mentioned and registers with the branch pipe 29 of the inlet pipe 24 of the pump A.

An elbow 42 also below the casing of the valve connects the inlet pipe 24 of the pump A to that portion of the pipe 37 which extends lengthwise of the vault 12, and a second elbow 43 also below the casing of the valve serves to connect the branch 31 to the pipe 37, whereby the discharge pipe 25 of pump A is connected to the inlet pipe 26 of pump B.

The slide valve C comprises a hollow elongated flat casing formed by two spaced apart plates 44 and 45, and is suitably anchored to the superstructure 16. The plate 44 is provided with a series of spaced apart openings 46 with which those pipes previously described as seated upon the upper portion of the casing are designed to register. The plate 45 is likewise provided with a series of spaced openings 47, which openings are in vertical alinement with the openings 46 and with which those pipes previously described as seated against the casing of the valve are designed to register.

A slide 48 is disposed for longitudinal movement within the casing of the valve C and is provided with spaced apart openings 49 designed to normally register with those openings 46 and 47 in the valve casing, which in turn are in register with the pipes 28, 30 and 26. See Figs. 5 and 6.

Fixed upon the forward end of the slide 48 is a detent block 50, designed to travel in a slot 51 in the plate 44 of the casing, and adapted for engagement with a spring pressed wheel 52 suitably mounted in a bracket 53 fixed to the casing as at 54. This detent and spring wheel are designed to latch the slide 48 in the position of one of its adjustments while a stop 55, upon the forward end of the casing, operates to hold the slide in another of its positions.

A pivoted hand lever 56 is connected in any suitable manner as by the link 57 to the detent block 50, whereby the slide 48 is moved into any position desired by the operator.

Mounted upon the superstructure 16, adjacent the pipe 25, is a soapstone dispensing device 58 which comprises the following: a hopper 59 supported in a suitable manner as by the frame-work 60, a slide valve 61 having a slide member 62 guided for movement as at 63 beneath the hopper, and a pivoted operating handle 64 connected at one end thereof to the slide member by a link 65. The slide member 62 has an opening 66 which normally registers with the lower end of a pipe section 67, which passes upwardly through the hopper and is connected to the pipe 25 at a point above the hopper. A second pipe 68 having its upper end registering with the lower end of the pipe 67 extends downwardly at an incline and is in turn connected to the pipe 25. Another, and relatively smaller, opening 69 is provided in the slide member 62 and is normally in register with the outlet 70 in the hopper 59. Stops 71 and 72 serve to limit the movement of the slide member 62.

The operation of the dispensing device is briefly as follows: The slide 62 as shown in Fig. 10 of the drawings, is normally positioned to receive a load from the hopper 59, in the opening 69, and the opening 66 is normally in position to clear the passage through pipe 67 and 68 for the circulation of the air currents from the pipe 25. As the operator moves the slide forward, by means of the lever 64, the load in the opening 69 is caught by the suction and carried either upward or downward into the pipe 25 according to the direction of circulation of the air currents. The slide 62 is then moved back to its normal position.

A brief summary of the operation of the previously described devices, it is thought, will suffice to impart a clear operation of the invention.

Figure 3:
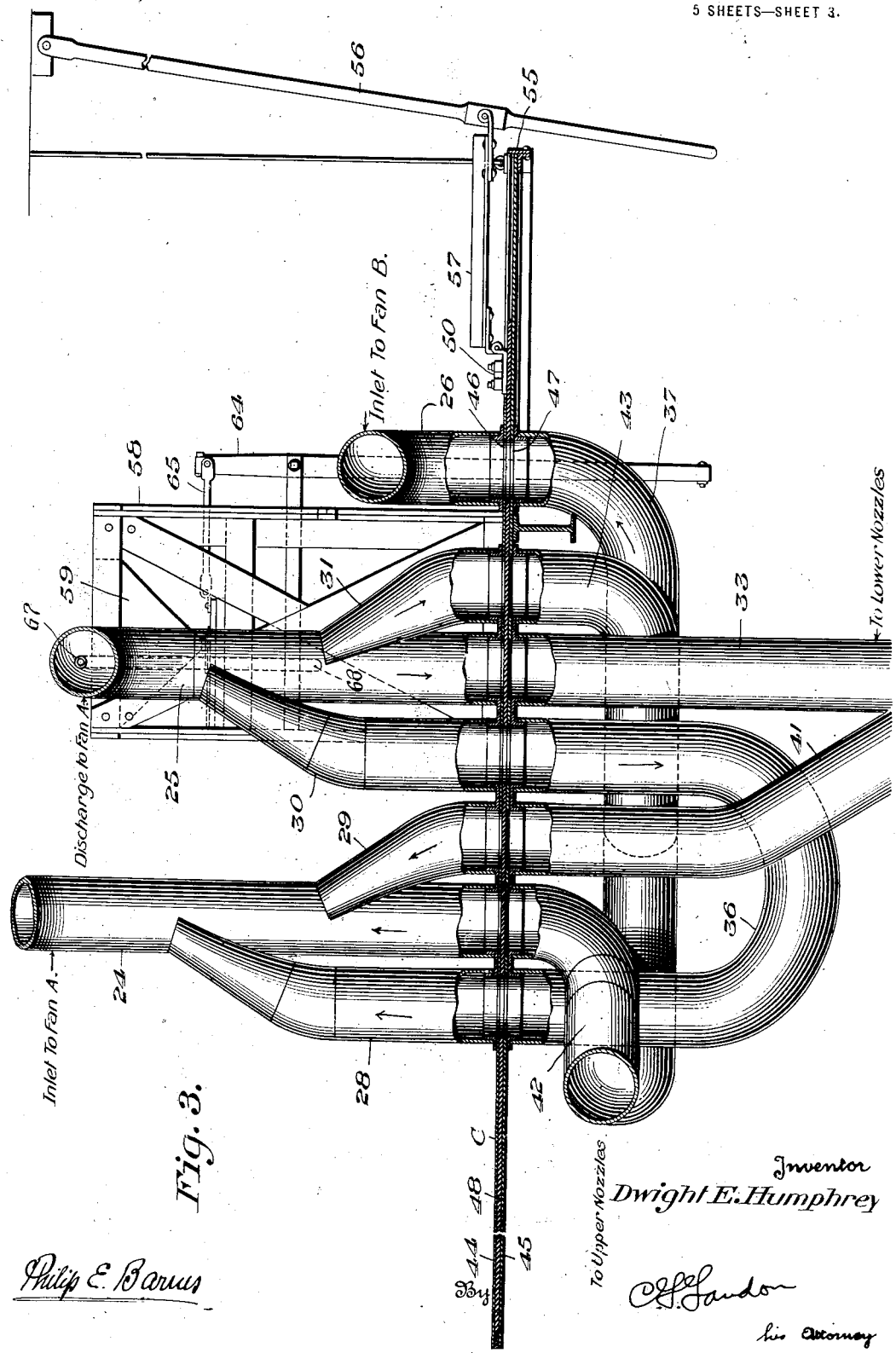
Fig. 3 is an enlarged transverse detail section taken on the irregular line 3—3 of Fig. 1.
Figure 4:
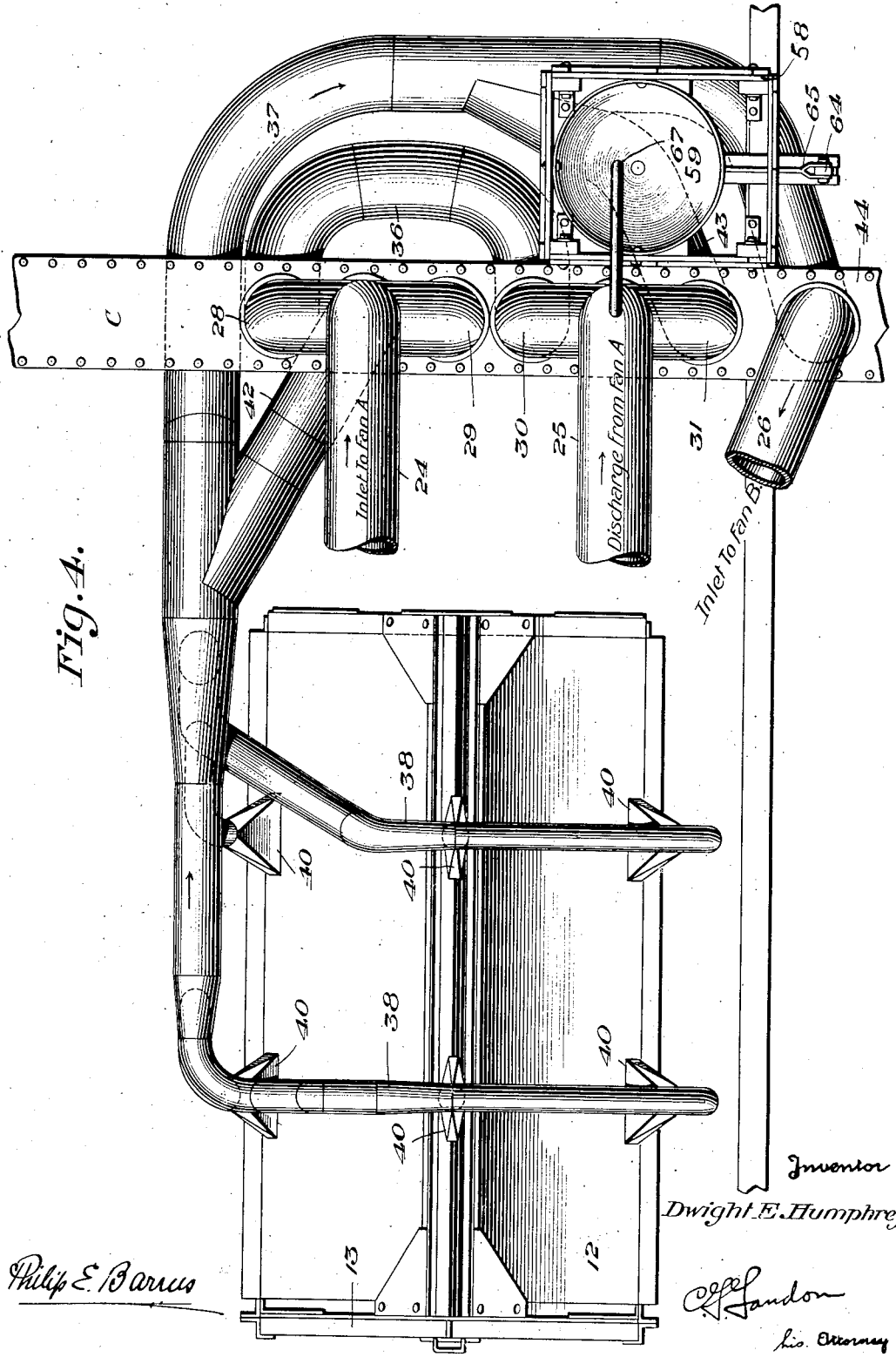
Fig. 4 is a detail top plan view of a portion of the device.

The tire carcasses are introduced into the vault 12 upon the truck 15 and the door 13 is closed while the valve slide 48 is positioned, as shown in Fig. 3 of the drawings. In this position of the slide 48, the openings 49 therein establish communication between the branches 28 and 30 above the valve C, and the union 36 below the valve, and also between the pipe 26 above the valve C, and the pipe 37 below the valve. Assuming that the pumps are in motion, the pump A now forces a current of air through the pipe 25 and branch 30 into the union 36, which air current returns to the pump A by way of branch 28 and the pipe 24. Thus, an air circuit is established wherein the powder ladened air is kept in circulation without its passing into the vault 12 as shown by the dotted arrows in Fig. 2. The pump B is now exhausting the air from the vault 12 through the pipes 26, 37 and the nozzles 40, and causing a partial vacuum therein as shown by the full line arrows in Fig. 2.

The valve slide 48 is now moved forward by means of the lever 56 until the detent block 50 engages the spring pressed wheel 52. The air from the pump A is now deflected from the previously described circuit from the pipe 25 into the pipe 33, through the nozzles 35, into the vault 12 from whence it is returned to the pump A through the nozzles 40, by way of the elbow 42 and the pipe 24. When this circuit is established the dispensing device 58 is operated, as previously described, to inject a small quantity of powdered soapstone into the pipe 25, the powder being impinged by the force of the air current against the carcasses within the vault and principally against the under side thereof. In this the second position of the valve slide, the air currents from the pump B are cut off from the vault entirely.

The valve slide 48 is again moved forward until the front end thereof abuts the stop 55 upon the casing 45, in which position the air currents from the pump A are switched from the pipe 25 by way of the branch 31 and elbow 43, into the pipe 37, and through the nozzles 40 into the vault, said currents returning to the pump A through nozzles 35, branch pipe 41, and branch pipe 29, into pipe 24. By directing the air into this circuit the powdered soapstone is impinged principally against the upper portion of the carcasses, and during this operation more soapstone may be injected into the pipe 25 if desired, according to the judgment of the operator. During this, the third position of the valve slide, the air currents from the pump B are again cut off from the vault.

The valve slide 48 is now returned to its second position and the operation coincident with that position is repeated after which the slide is returned to its normal position, when the air currents from the pump A are short circuited as previously described. The door 13 is now opened, whereupon the pump B exhausts the dust ladened air from the vault through the nozzles 40, pipes 37 and 26, and discharges the same into the drum 32.

The amount of powdered material injected is very small after the air from the pump A is once well charged, and the losses in the soapstone powder is relatively small, the actual amount lost being only that which is carried away upon the tires and the supporting equipment therefor. That powdered material which is left suspended in the air in the vault after the dusting operation is completed and which is exhausted from the vault and deposited in the drum 32 may be used again and is therefore not lost to the operator.

It will now be seen that I have devised a mechanism of particular utility, not only in the art for which its use was specifically intended, but which is adaptable for use in various lines other than the tire art, and it will also be understood that the invention is not limited to the precise arrangement and construction illustrated, but that such rearrangement of parts and changes in construction may be made as fall within the scope of the appended claims.

What I claim is:

1. In an apparatus of the class described, a vault, a blower, a series of ducts arranged to provide different circuits for directing the air from the blower into and from the vault and a short circuit for by-passing the air, and means for deflecting the air through a selected circuit.

2. In an apparatus of the class described, a vault, a blower, a series of ducts arranged to provide different circuits for directing the air into and from the vault and a short circuit for by-passing the air, and means common to all of the ducts for deflecting the air through a selected circuit.

3. In an apparatus of the class described, a vault, a blower, a series of ducts arranged to provide different circuits for directing the air from the blower into and from the vault and a short circuit for by-passing the air, a suction pump connected with the series of ducts, and means for deflecting the air through a selected circuit.

4. In an apparatus of the class described, a vault, a blower, a series of ducts arranged to provide different circuits for directing air from the blower into and from the vault and a short circuit for by-passing the air, a suction pump arranged to exhaust the air from the vault, and air controlling means comprising a slide valve common to the ducts and the suction pump for deflecting the air through a selected circuit.

5. In an apparatus of the class described, a vault, a blower, a series of ducts arranged to provide different circuits for directing the air from the blower into and from the vault and a short circuit for by-passing the air, means for deflecting the air through a selected circuit, and devices for periodically depositing a uniform load of coating material into one of the ducts.

6. In an apparatus of the class described, a vault, a blower, a series of ducts arranged to provide different circuits for directing the air into and from the vault and a short circuit for by-passing the air, means common to all of the ducts for deflecting the air through a selected circuit, and devices for periodically depositing the uniform load of coating material into one of the ducts.

7. In an apparatus of the class described, a vault, a blower, a series of ducts arranged to provide different circuits for directing the air from the blower into and from the vault and a short circuit for by-passing the air, a suction pump connected with the series of ducts, means for deflecting the air through a selected circuit, and devices for periodically depositing the uniform load of coating material into one of the ducts.

8. In an apparatus of the class described, a vault, a blower, a series of ducts arranged to provide different circuits for directing air from the blower into and from the vault and a short circuit for by-passing the air, a suction pump arranged to exhaust the air from the vault, air controlling means comprising a slide valve common to the ducts and the suction pump for deflecting the air through a selected circuit, and devices for periodically depositing a uniform load of coating material into one of the ducts.

9. In an apparatus of the class described, a vault, a blower, a series of ducts arranged to provide different circuits for directing the air from the blower into and from the vault and a short circuit for by-passing the air, and means operable to exhaust the air from the vault when the air in the ducts is being by-passed.

10. In an apparatus of the class described, a vault, a blower, a series of ducts arranged to provide different circuits for directing the air from the blower into and from the vault and a short circuit for by-passing the air, a suction pump arranged to exhaust the air from the vault, and a slide valve for directing the air through a selected circuit said valve being operable to exhaust the air from the vault when the air from the blower is being by-passed.

11. An apparatus for coating articles with pulverulent material comprising the combination with a closable vault for receiving the articles to be coated, of an air pump, a system of air conveying ducts connecting said pump and said vault for establishing different air circuits through the pump and the vault, means connected to said system of ducts for directing the air from said ducts into and from the vault, means for opening and closing said ducts to direct the air by a selected circuit through said vault, means controlled by said opening and closing means for by-passing the air before it reaches the vault, means for charging the air in said ducts with pulverulent material, and means for exhausting the air from said vault while the air in said ducts is being by-passed.

12. An apparatus for coating articles with pulverulent material comprising the combination with a closable vault for receiving the articles to be coated, of an air pump, a system of air conveying ducts connecting said pump and said vault for establishing different air circuits through the pump and the vault, means connected to said system of ducts for directing the air from said ducts into and from the vault, manually operated means for opening and closing said ducts to direct the air by a selected circuit through said vault, means controlled by said opening and closing means and for by-passing the air before it reaches the vault, means for charging the air in said ducts with pulverulent material, and an air pump for exhausting the air in said vault while the air in said ducts is being by-passed.

13. An apparatus for coating articles with pulverulent material comprising the combination with a closable vault for receiving the articles to be coated, of an air pump, a system of air conveying ducts connecting the pump and the vault for establishing different air circuits through said pump and said vault, means connected to said system of ducts for directing the air from said ducts into and from the vault, a valve for opening and closing said ducts to direct the air by a selected circuit through said vault, means controlled by said valve for by-passing the air before it reaches the vault, means for charging the air in said ducts with pulverulent material, and an air pump for exhausting the air from said vault while the air in said ducts is being by-passed.

14. An apparatus of the character specified comprising the combination with a closable vault for receiving tire carcasses or the like, of an air pump, a system of air conveying ducts connecting the pump and the vault for establishing different air circuits through said pump and said vault, means connected with said system of ducts for directing the air from said ducts into and from the vault, a valve for opening and closing said ducts to direct the air by a selected circuit through said vault, means for operating said valve, means operated by said valve for by-passing the air before it reaches the vault, a powder dispensing device connected with said system of ducts, means for operating said device whereby the air in the ducts is charged with powder, and an air pump for exhausting the air from the vault while the air in said ducts is being by-passed.

15. An apparatus of the character specified comprising in combination with a closable vault for receiving tire carcasses or the like, of an air pump, a system of ducts connecting said pump and said vault for establishing different air circuits through said pump and said vault, a plurality of nozzles connected with said system of ducts for directing the air into and from said vault, a valve for opening and closing said ducts to direct the air by a selected circuit through said vault, means for manually operating the valve, a by-pass opened and closed by said valve whereby the air is short circuited back to the pump before it enters the vault, a powder dispensing device, means connecting said dispensing device with one of said ducts, means for operating said device whereby powder is introduced in said duct, and an air pump for exhausting the air from the vault while the by-pass is open.

16. An apparatus of the character specified comprising the combination with a closable vault, of an air pump, a system of ducts connecting the pump and the vault for establishing different air circuits through said pump and said vault, means connected with said system of ducts for directing the air into and from the vault, a slide valve for opening and closing the ducts to direct the air by a selected circuit through the vault, means for operating the slide valve, means operated by said slide valve for by-passing the air in the ducts before it reaches the vault, means for charging the air in the ducts with powdered material, and an air pump for exhausting the air from the vault while the air in the ducts is being by-passed.

17. An apparatus of the character specified comprising the combination with a closable vault for receiving tire carcasses or the like, of an air pump, a system of ducts connecting the pump and the vault for establishing different air circuits through said pump and said vault, a plurality of nozzles connected with said system of ducts for directing the air into and from the vault, a slide valve for opening and closing the ducts to direct the air by a selected circuit through the vault, means for manually operating the slide valve, a by-pass opened and closed by said slide valve whereby the air in the ducts is short circuited and prevented from centering the vault, a powder dispensing device connected to one of the ducts, means for manually operating said device, and an air pump for exhausting the air from said vault while the by-pass is open.

18. An apparatus of the character specified comprising the combination with a closable vault for receiving tire carcasses and the like, of an air pump, a system of ducts connecting the pump and the vault for establishing different air circuits through said vault and said pump, a plurality of nozzles connected with said ducts for directing the air into and from said vault, a valve for opening and closing the ducts to thereby direct the air in a selected circuit through the vault, a by-pass connected with said ducts and adapted to be opened and closed by said slide valve to short circuit the air before it reaches the vault, means for charging the air in the ducts with powdered material, a second pump for exhausting the air from the vault when said by-pass is open, and a duct connecting said pump with said system of ducts.

19. An apparatus of the character specified comprising the combination with a closable vault for receiving tire carcasses or the like, of an air pump, a system of ducts connecting the pump and the vault for establishing different air circuits through said pump and vault, a plurality of nozzles connected with said ducts for directing the air into and from the vault, a slide valve for opening and closing the ducts to thereby direct the air in a selected circuit through the vault, means for operating the slide valve, a by-pass, operated by said slide valve to short circuit the air in the ducts before it reaches the vault, means for injecting powdered material into the system of ducts, a second pump for exhausting the air from the vault when the air in the ducts is being short circuited, and a flue connecting said pump with said system of ducts.

20. An apparatus of the character specified comprising in combination, a closable vault for receiving tire carcasses or the like, an air pump, an air duct connected to said pump and leading to said vault, means for periodically introducing powdered material into said air duct air conveying means connected to said air duct and projecting through the bottom and sides of said vault, a second air duct connected to said pump and leading to said vault, air conveying means connected to said second duct and projecting through the top portion of the vault, a down take duct connecting said first duct with said second duct, an uptake duct connecting said first duct with said second duct, means for opening and closing said ducts to direct the air therethrough by a selected circuit, a by-pass between said first and said second ducts said by-pass being operated by said opening and closing means, and means for exhausting the air from the vault when said by-pass is in operation.

21. An apparatus of the character specified comprising in combination, a closable vault for receiving tire carcasses or the like, an air pump, an air duct connected to said pump and leading to said vault, means for periodically introducing powdered material into said air duct, air conveying means connected to said air duct and projecting through the bottom and sides of said vault, a second air duct connected to said pump and leading to said vault, air conveying means connected to said second duct and projecting through the top portion of the vault, a down take duct, connecting said first duct with said second duct, an uptake duct, connecting said first duct and second duct, a slide valve for opening and closing said ducts to direct air therethrough by a selected circuit, a by-pass between said first and said second ducts, said by-pass being operated by said slide valve, and a second air pump for exhausting the air from the vault when said by-pass is in operation.

22. An apparatus of the character specified comprising in combination, a closable vault for receiving tire carcasses or the like, an air pump, an air duct connected to said pump and leading to said vault, manually operated means for periodically introducing powdered material into said duct, a second duct connected to the pump and leading to the vault, a plurality of nozzles in the top bottom and sides of the vault each of which nozzles is disposed in a position substantially radial of the tire carcasses within the vault, branch conduits connecting certain of said nozzles with said first duct, branch conduits connecting certain of said nozzles with said second duct, a down take duct connecting said first duct with said second duct, an uptake duct connecting said first duct with said second duct, a slide valve for opening and closing said ducts to direct air therethrough by a selected circuit, means for operating said slide valve, a by-pass between said first and second ducts said by-pass being operated by said slide valve, and means for exhausting the air from said vault when said by-pass is in operation.

23. An apparatus of the character specified comprising in combination, a closable vault for receiving tire carcasses or the like, an air pump, an air duct connected to said pump and leading to said vault, means for periodically introducing powdered material into said air duct, means for operating said first means, a second duct connected to said pump and leading to said vault, nozzles in the top, bottom and sides of the vault each of which nozzles is disposed in a position substantially radial of the tires within the vault, branch conduits connecting certain of the nozzles with said first duct, branch conduits connecting certain of the nozzles with said second duct, an uptake duct connecting said first and said second ducts, a downtake duct connecting said first and said second ducts, a slide valve for opening and closing said ducts to direct air therethrough by a selected circuit, a by-pass between said first and second ducts' said by-pass being opened and closed by said slide valve, means for manually operating said slide valve, and a pump for exhausting the air from the vault while said by-pass is open.

24. An apparatus of the character specified comprising in combination, a closable vault for receiving tire carcasses or the like, an air pump, an air duct connected to said pump and leading to said vault, a powder dispensing device connected to said duct, means for manually operating said device, a second duct connected to said pump and leading to said vault, a plurality of nozzles projecting through the top bottom and sides of the vault each nozzle being disposed in a position substantially radial of the carcasses within the vault, branch conduits connecting certain of the nozzles with the first duct, branch conduits connecting certain of the nozzles with said second duct, a downtake duct connecting said first and second ducts, an uptake duct connecting said first and second ducts, a slide valve for opening and closing said ducts to direct air therethrough by a selected circuit, means for manually operating said slide valve, a by-pass between said first and second ducts said by-pass being opened and closed by said slide valve, a second pump for exhausting air from said vault, and a conduit connecting said pump with said downtake duct said conduit being opened and closed by said slide valve simultaneously with the opening and closing of said by-pass.

25. The method of coating tire carcasses with powdered soapstone which consists in the following steps, 1st, introducing the tires into a closable chamber, 2nd, releasing powder ladened streams of air under pressure, simultaneously against different portions of the surface of the tire whereby a coating of powdered soapstone is formed thereon, and 3rd, exhausting the floating particles of powder from the chamber.

26. The method of coating objects with powdered soapstone material which consists in the following steps, 1st, introducing the objects to be coated into a closable chamber, 2nd, introducing jets of air charged with powdered soapstone into the lower portion of said chamber and against the lower portion of the objects and simultaneously exhausting said charged air through the top of the chamber, and 3rd, introducing jets of air charged with pulverulent material into the top portion of the chamber against the upper portion of the objects therein and simultaneously exhausting said charged air through the lower portion of the chamber.

In witness whereof I have hereunto signed my name in the presence of two subscribing witnesses.

DWIGHT E. HUMPHREY.

Witnesses:
L. M. HARTMAN,
A. J. KNIGHT.